UNITED STATES PATENT OFFICE.

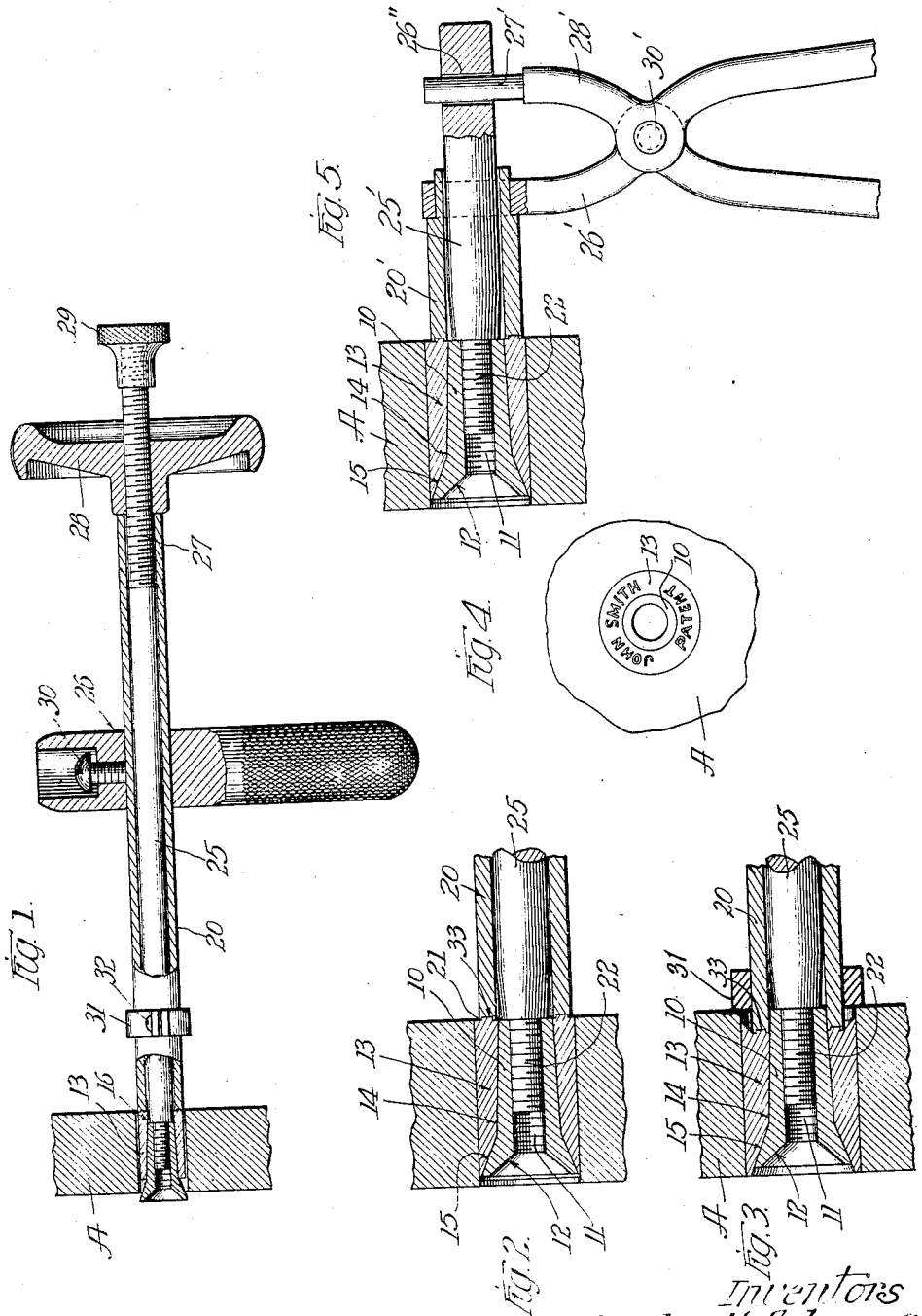

CHARLES N. ACKERMAN AND JOHN L. JOHNSON, OF CHICAGO, ILLINOIS.

PRESSURE-TOOL FOR SETTING SCREW-ANCHORS.

1,177,843.  Specification of Letters Patent.  Patented Apr. 4, 1916.

Application filed March 20, 1915. Serial No. 15,982.

*To all whom it may concern:*

Be it known that we, CHARLES N. ACKERMAN and JOHN L. JOHNSON, citizens of the United States, residing at Chicago, in the county of Cook and State of Illinois, have invented certain new and useful Improvements in Pressure-Tools for Setting Screw-Anchors, of which the following is a specification.

Our invention relates to improvements in tools for setting screw anchors and the like and has for its general object to provide a hand operated tool affording opposing parts for coöperation with the body and the ductile sleeve of a suitable screw anchor and operable to set the screw anchor in an appropriate opening, (bottomless or otherwise) by pressure exerted on the anchor parts through the operation of the members of the tool.

In the drawings wherein we have illustrated embodiments of our invention for purposes of full disclosure; Figure 1 is a vertical cross sectional view, with parts in elevation, showing an embodiment of our invention in working association with a screw anchor. Figs. 2 and 3 are enlarged sectional views illustrative of the effective operation of the tool. Fig. 4 is an end view of a set anchor; and Fig. 5 is a sectional elevation of a modified tool embodying features of our invention.

A screw anchor such as our tool is particularly adapted to set consists of a rigid body 10 and a ductile sleeve 13. Said body has a tapering exterior and a central bore 11 extending through the body from end to end, said bore being screw-threaded at its forward portion, and preferably enlarged into a bell 12 at its rear end. The exterior conformation of body 10 is preferably biconoidal, its front portion having a gradual taper as at 14 and its rear end a more abrupt taper as at 15. The ductile sleeve, 13, has a normal bore 16 of approximately the size of the smaller front end of the body and is preferably preliminarily forced upon the body 10 sufficiently for self retention thereon and to stand with its front and rear ends respectively overhanging the front end of the body and stopping short of the rear end of the body. Such sleeve has its periphery of cylindrical shape and approximately the size of the maximum diameter of the body. Thus, as the sleeve is forced rearwardly with respect to the body, it is expanded, generally, by the tapered formation of the body, maximum expansion taking place primarily at the rear end of the sleeve on account of the abrupt taper 15.

The tool illustrated in Figs. 1 to 3 includes a body 20 affording an annular pressure-surface 21 at its front end and for coaction with the sleeve member of the anchor. The internal diameter of the body 20 is preferably somewhat greater than the smallest diameter of the anchor body 10 to afford such clearance that the tool body 20 may, upon occasion, travel a considerable distance over and outside of the end portion of the anchor body. Centrally within this clearance space of the tool body is provided a pilot 22 adapted to enter the screw bore 11 of the anchor body. The pilot 22 is screw threaded or otherwise suitably provided with means for positive engagement with the screw body to fix the latter in relation to the pilot. The pilot 22 is axially movable with respect to the tool body 20, and suitable means are provided for manually moving the pilot member with respect to the pressure surface, whereby opposite forces—a pulling force on anchor body 10 and a pushing force on anchor sleeve 13—may be exerted to set the anchor. To this end the tool body 20 is preferably in the form of an elongated tube affording bearing to a stem 25 that extends through and beyond the body-ends and carries at its forward end the pilot 22; a handle element 26 is connected with the tubular tool body 20; and a normally operable means is provided for powerful retraction of the stem 25 through the tubular tool body. Thus, in Fig. 1, the portion of stem 25 that extends beyond the tool body is screw threaded as at 27 and an internally threaded handle or wheel-nut 28 is mounted on the threaded portion 27 so that by rotation of the handle the stem may be retracted through the tool body 20. A knurled stem-turning handle 29 is also preferably screwed fast or otherwise fixed on the extremity of the stem 25 beyond the handle 28.

While the handle 26 that coöperates with the tool body 20 may be of any desired form it may conveniently be made as a cross bar positioned on the tube by a set screw 30. If desired (although it is not essential) a gage collar 31, preferably in the form of a slit clamp arranged to be tightened or loosened by screw 32, may be applied to the tube 20 at any desired point of adjustment, adjacent its active end.

In the operation of the tool shown in Fig. 1, it will be apparent that stem-turning handle 29 enables the stem 25 to be rotated, (carrying with it the hand wheel 28) so as rapidly to spin the threaded pilot 22 into the threads of the anchor body 10. Then, the wheel-nut 28 is spun on screw 27 so that the pressure end 21 of the tubular body 20 just bears against the ductile sleeve, and the anchor is inserted in a suitable cylindrical hole in a support A. If the hole is deep, the gage collar 31 may be used to determine the plane at which the anchor will be located. As the handle 26 is firmly held in one hand the hand wheel 28 is forcibly rotated with the other hand, retracting stem 25 with respect to the body 20, and so causing the setting pressure to be applied on the ductile sleeve 13. The frictional engagement between the anchor body and sleeve, and between the anchor sleeve and tool body 20, tends to prevent any rotation of the stem 25 due to the screwing action of handle 28, and this resistance may be aided by making projections or depressions 33 on the pressure end of the body 20 in the form of lettering or otherwise.

Obviously, as shown in Fig. 2, if the hole in the support A is of suitable size and the parts are properly manipulated, the anchor may be set flush with the face of a support, A, but if it should be requisite, (as in the case of setting the anchor in an oversized hole,) to force the pressure receiving end of the ductile anchor sleeve back beyond the smaller end of the anchor body, this may be done as illustrated in Fig. 3, the extremity of the anchor body entering the clearance space provided therefor in the tool body 20.

In Fig. 5, we have illustrated a modified embodiment of our invention, in which the cylindrical tool body 20' is carried by a handle lever 26', and the pilot-carrying stem 25' sliding through said body has a hole 26" engaged by a stud 27' of an opposing handle lever 28' pivoted as at 30' to the first said lever 26' so that by pressure on the handgrasped ends of the two levers 26' and 28' the pilot carrying stems 25' may be retracted through the tubular body 20', thus substituting a lever action for the screw action for effecting relative movement between the two members of the tool. Both forms of tool have been found satisfactory in operation, but for cheapness, simplicity, rotatability of stem 25, and other reasons, we prefer commercially to employ the form of tool first described.

While we have herein described in some detail particular embodiment of our invention for purposes of full disclosure thereof it will be apparent that changes might be made in the structure and arrangement thereof without departure from the spirit of our invention and within the scope of the appended claims.

Having described our invention, what we claim is:—

1. A tool for setting a screw anchor that consists of a rigid body and a ductile sleeve, said tool comprising, in combination, a tool body having an annular pressure face, a pilot member normally projecting beyond said pressure face and spaced apart therefrom by a clearance space, anchor-body-engaging means on said pilot, and means for forcibly moving said tool body and said pilot with respect to each other.

2. A tool for setting a screw anchor that consists of a rigid body and a ductile sleeve, said tool comprising, in combination a tubular body member adapted to bear at one end upon the ductile sleeve, a stem slidable therein, a threaded pilot on said stem spaced apart from and coaxial with the active end of said tool body and arranged to engage the said rigid body, and pressure applying means for forcibly moving said tool body and said pilot with respect to each other.

3. A tool of the character described comprising a tubular body having a pressure-applying surface at one end, a stem extending through said body and projecting from both ends thereof, said stem carrying a threaded pilot normally projecting beyond the pressure applying end of said body and spaced apart therefrom, and a portion of said stem projecting from the opposite end of said body being screw threaded, and a pressure applying handle threaded on the last said end of said stem.

4. A tool of the character described comprising a tubular body having a pressure-applying surface at one end, a stem extending through said body and projecting from both ends thereof, said stem carrying a threaded pilot normally projecting beyond the pressure applying end of said body and spaced apart therefrom, and a portion of said stem projecting from the opposite end of said body being screw threaded, and a pressure applying handle threaded on the last said end of said stem, and a turning handle fixed on the said stem beyond said pressure applying handle.

5. A tool of the character described comprising a tubular body having a pressure-applying surface at one end, a stem extending through said body and projecting from both ends thereof, said stem carrying a threaded pilot normally projecting beyond the pressure applying end of said body and spaced apart therefrom, and a portion of said stem projecting from the opposite end of said body being screw threaded, and a pressure applying handle threaded on the last said end of said stem, and a transverse handle carried by said body between its ends.

6. A tool for setting a screw anchor that consists of a rigid body and a ductile sleeve, said tool comprising in combination a tubular body adapted to engage at one end the ductile sleeve, a stem slidably extending therethrough and projecting from both ends thereof, said stem having a threaded pilot at one end for engagement with the rigid body, and means acting on the other end of said stem to move it axially with respect to the body and set the anchor.

7. In a tool of the character described, the combination of a tubular body, a stem slidably extending therethrough and projecting from both ends thereof, said stem having a threaded pilot at one end, and means acting on the other end of said stem to move it axially with respect to the body, and a depth gage adjustably mounted on the body.

In testimony whereof we hereunto set our hands.

CHARLES N. ACKERMAN.
JOHN L. JOHNSON.

In the presence of—
STANLEY W. COOK,
MARY F. ALLEN.